US012616077B2

(12) United States Patent　　　(10) Patent No.:　US 12,616,077 B2

Liu　　　　　　　　　　　　　　　　　(45) Date of Patent:　　　May 5, 2026

(54) AERATOR

(71) Applicant: Fan Liu, Suzhou (CN)

(72) Inventor: Fan Liu, Suzhou (CN)

( * ) Notice:　Subject to any disclaimer, the term of this patent is extended or adjusted under 35 U.S.C. 154(b) by 388 days.

(21) Appl. No.: 18/334,159

(22) Filed:　Jun. 13, 2023

(65)　　　　Prior Publication Data

US 2024/0008380 A1　　Jan. 11, 2024

(30)　　Foreign Application Priority Data

Jul. 7, 2022　　(CN) ......................... 202221756421.3
　Apr. 18, 2023　(CN) ......................... 202320863881.4

(51) Int. Cl.
　　*A01B 1/24*　　　　(2006.01)
　　*A01B 1/22*　　　　(2006.01)
(52) U.S. Cl.
　　CPC ................ *A01B 1/243* (2013.01); *A01B 1/22* (2013.01)
(58) Field of Classification Search
　　CPC .................................. A01B 1/22; A01B 1/243
　　See application file for complete search history.

(56)　　　　　References Cited

U.S. PATENT DOCUMENTS 1,893,258 A * 1/1933 Washburn .............. A01B 1/243
　　　　　　　　　　　　　　　　　　　　111/99
1,965,177 A * 7/1934 Finkl ....................... A01B 1/24
　　　　　　　　　　　　　　　　　　　　100/295
1,982,749 A * 12/1934 Leeberg ................. A01B 1/243
　　　　　　　　　　　　　　　　　　　　111/92

2,020,571 A * 11/1935 Pick ....................... A01B 1/243
　　　　　　　　　　　　　　　　　　　　111/99
2,079,506 A * 5/1937 Jenks ...................... A01B 1/22
　　　　　　　　　　　　　　　　　　　　111/92
2,140,266 A * 12/1938 Leeberg ................. A01B 1/243
　　　　　　　　　　　　　　　　　　　　30/301
3,011,563 A * 12/1961 Ceretti ..................... A01B 1/24
　　　　　　　　　　　　　　　　　　　　294/50.7
4,791,995 A * 12/1988 Hochlan, Jr. ............ A01B 1/06
　　　　　　　　　　　　　　　　　　　　111/99
5,709,273 A * 1/1998 Roth ........................ A01B 1/22
　　　　　　　　　　　　　　　　　　　　172/22
5,813,471 A * 9/1998 Ramsey ................. A01B 1/243
　　　　　　　　　　　　　　　　　　　　D8/13
8,714,275 B1 * 5/2014 Ng .......................... A01B 1/243
　　　　　　　　　　　　　　　　　　　　172/354
11,160,202 B1 * 11/2021 Haddick ................ A01B 1/243
2009/0223685 A1 * 9/2009 Garcia .................... A01B 1/00
　　　　　　　　　　　　　　　　　　　　172/22
2019/0014712 A1 * 1/2019 Rodriguez .............. A01B 1/20

FOREIGN PATENT DOCUMENTS

DE　　102004000020 A1 * 6/2005 ............. A01B 1/243
GB　　　　　527180 A * 10/1940 ............. A01B 1/243
GB　　　　2557971 A * 7/2018 ............... A01C 5/02

* cited by examiner

*Primary Examiner* — Matthew R Buck

(74) *Attorney, Agent, or Firm* — Westbridge IP LLC

(57)　　　　　ABSTRACT

An aerator includes a punching assembly including a fixed plate and multiple rows of punching nails installed on the fixed plate and extending from the bottom surface of the fixed plate, with each row including multiple punching nails; and an installation body, on which the punching assembly is installed, wherein the installation body is provided with a hand-held part, the hand-held part is configured for the user to hold while using the punching assembly to punch holes. The aerator provided herein is not only high in punching efficiency, flexible and convenient to use, but also simple in structure and low in cost.

14 Claims, 4 Drawing Sheets

AERATOR

CROSS-REFERENCE TO RELATED APPLICATIONS

This application claims priority to Chinese Patent Application No. 202221756421.3, filed with the China National Intellectual Property Administration on Jul. 7, 2022 and Chinese Patent Application No. 202320863881.4, filed with the China National Intellectual Property Administration on Apr. 18, 2023. All of the aforementioned applications are incorporated herein by reference in their entireties.

TECHNICAL FIELD

The present disclosure relates to the technical field of agricultural tools, and in particular, to an aerator.

BACKGROUND

A lawn is a green area that is artificially planted or artificially maintained for aesthetic purposes. Once a lawn has been built, maintenance and management such as fertilization, watering, pruning, and aeration need to be performed on the lawn. Wherein aeration is crucial for the growth and development of grass in a lawn, and it is an effective method for improving the lawn's ventilation and water permeability. As grass in the lawn grows, grass roots become densely packed and the soil gradually becomes compacted, it becomes increasingly difficult for air, water, and nutrients to enter the soil.

By using an aerator to punch holes on the lawn, channels are created for water to enter the soil and create conditions for oxygen to enter. Due to the large size of the lawn, users hope to use an efficient aerator to reduce the workload.

SUMMARY

In view of this, the present disclosure provides an aerator that can improve the efficiency of aeration of a lawn.

The present disclosure provides an aerator, the aerator includes a punching assembly, and a punching assembly. The punching assembly includes a fixed plate and multiple rows of punching nails installed on the fixed plate and extending from a bottom surface of the fixed plate, with each row including multiple punching nails. The punching assembly is installed on the installation body, wherein the installation body is provided with a hand-held part, the hand-held part is configured for the user to hold while using the aerator to punch holes.

In one embodiment, the punching nail is detachably installed on the fixed plate.

In one embodiment, the punching nail includes a nail body and a nail cap provided on one end of the nail body. The fixed plate is provided with installation holes corresponding to the punching nails one by one, and the nail body passes downwards through an installation hole from an upper side of the fixed plate, and is connected with a nut through a thread, so the punching nail is detachably fastened to the fixed plate; wherein a cross section of the nail body at a lower end tapers gradually in a direction away from the fixed plate.

In one embodiment, a diameter of the nail body of the punching nail is 4-6 mm.

In one embodiment, a length of the nail body of the punching nail from the fixed plate to a lower end is 60-70 mm.

In one embodiment, a distance between two adjacent rows of punching nails is 35-45 mm, and a distance between two adjacent punching nails in each row is 50-60 mm.

In one embodiment, the punching nails are arranged in three rows.

In one embodiment, each row is provided with five punching nails.

In one embodiment, the fixed plate is provided with a foot-pedaling part which is configured to be stepped by a user to apply pressure on the punching nails when punching holes.

In one embodiment, the installation body comprises a first connecting rod and a second connecting rod fixed on one side of the fixed plate away from the punching nails, and a region of the fixed plate between the first connecting rod and the second connecting rod forms the foot-pedaling part.

In one embodiment, the installation body includes a first subassembly, a second subassembly, and a third subassembly. The hand-held part is arranged on the first subassembly; the second subassembly is connected to one side of the fixed plate away from the punching nails; the third subassembly is connected between the first subassembly and the second subassembly and detachably connected with the first subassembly and the second subassembly respectively.

In one embodiment, the second subassembly includes a first connecting rod, a second connecting rod which are installed on the fixed plate, and a third connecting rod respectively connected to the first connecting rod and the second connecting rod, the third subassembly is configured to be detachably connected with the third connecting rod; the region of the fixed plate located between the first connecting rod and the second connecting rod forms the foot-pedaling part for stepping on.

In one embodiment, the first subassembly includes a horizontal rod and a vertical rod perpendicular to the horizontal rod, the horizontal rod extends from both sides of the vertical rod to form two hand-held parts, and the third subassembly is detachably connected with the vertical rod. The aerator further includes two handle gloves, and the two handle gloves are respectively sleeved on the two hand-held parts.

In one embodiment, the first subassembly, the second subassembly and the third subassembly are respectively made of a tube body; one end of the third subassembly is sleeved with the first subassembly and fixed to the first subassembly with a first bolt, and the other end is sleeved with the second subassembly and fixed to the second subassembly with a second bolt.

In one embodiment, among two tube parts, that are mutually sleeved, of the third subassembly and the first subassembly, the tube part arranged outside is provided with a first open notch extending to an end, the first open notch is configured that the tube part arranged outside is able to be constricted through the first open notch to press against the tube part arranged inside when a bolt is used to connect.

In one embodiment, among two tube part, that are mutually sleeved, of the third subassembly and the second subassembly, the tube part arranged outside is provided with a second open notch extending to an end, the second open notch is configured that the tube part arranged outside is able to be constricted through the second open notch to press against the tube part arranged inside when a bolt is used to connect.

The technology scheme provided herein adopts the method of applying force to multiple rows of punching nails by holding the hand-held part with the hand and stepping on a fixed board, so as to punch holes through the multiple rows of punching nails simultaneously. The aerator provided is not only high in efficiency of aeration, flexible and convenient to use, but also simple in structure and low in cost.

Other features and advantages will be described in detail in the subsequent section of specific implementation.

BRIEF DESCRIPTION OF THE DRAWINGS

The accompanying drawings forming a part of this disclosure are provided for further understanding of this disclosure. The illustrative embodiments and their explanations provided in this disclosure are intended to explain and not to limit this disclosure in any way. In the accompanying drawings.

DETAILED DESCRIPTION OF THE EMBODIMENTS

The technical solution in this embodiment will be described clearly and completely with reference to the accompanying drawings. It should be noted that the described embodiment is only a part of the embodiments disclosed in this specification, rather than all embodiments. Based on the embodiments disclosed in this specification, all other embodiments that ordinary skilled persons can obtain without creative labor are within the scope of protection of this specification. In non-conflicting situations, the embodiments and features thereof described in this specification can be combined with each other.

In the description provided herein, it should be understood that terms such as "center," "longitudinal," "lateral," "top," "bottom," "left," "right," "vertical," "horizontal," "upper," "lower," "axial," "radial," "circumferential," and the like indicating spatial or positional relationships are based on the spatial or positional relationships shown in the accompanying drawings, and are only used for the convenience of describing the present disclosure and simplifying the description. They do not indicate or imply that the device or component referred to must have a specific orientation, be constructed or operated in a specific orientation, and should not be interpreted as limiting the present disclosure. Additionally, "inner" and "outer" refer to the inner and outer contours of the respective components themselves.

In addition, the terms "first" and "second" are only used for the purpose of description and cannot be understood as indicating or implying relative importance or implying the quantity of the indicated technical features. Therefore, features that are limited by "first" or "second" may explicitly or implicitly include at least one of those features.

There are various types of aerators available for punching holes on a lawn to promote air circulation. For example, a plurality of punching nails is arranged on the sole of the shoe, and when the shoe is worn on the foot, punching holes in a lawn can be performed while walking. However, this kind of shoe aerator is not only inconvenient to wear, but also easy to slip off during walking, and it is extremely inconvenient to walk, and easy to fall, which result in low punching efficiency. For another example, a punching equipment with a walking mechanism and a driving mechanism may be used, but this kind of punching equipment is complex in structure and high in cost.

Figure 1:
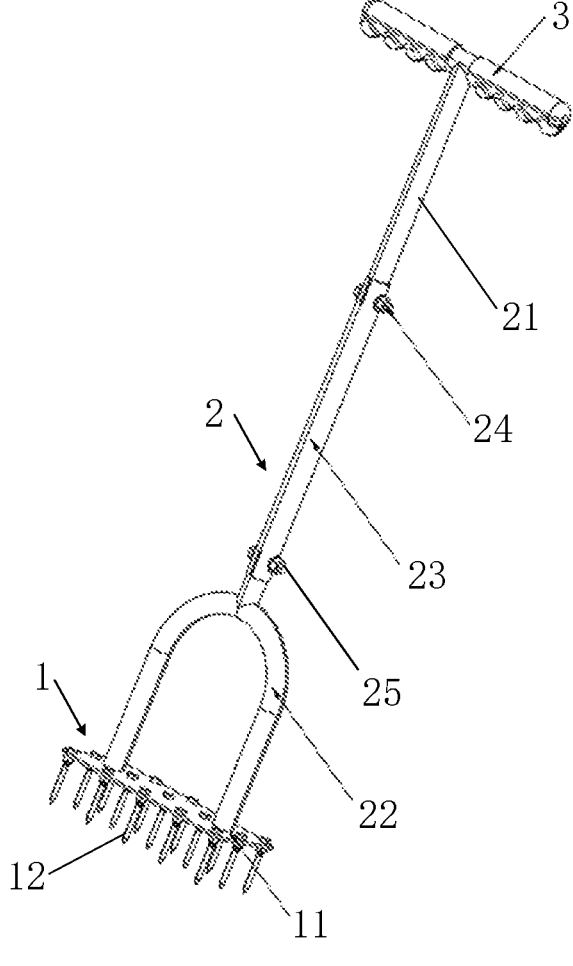
FIG. 1 is a schematic structural view of an aerator according to an embodiment of the present disclosure.
Figure 2:
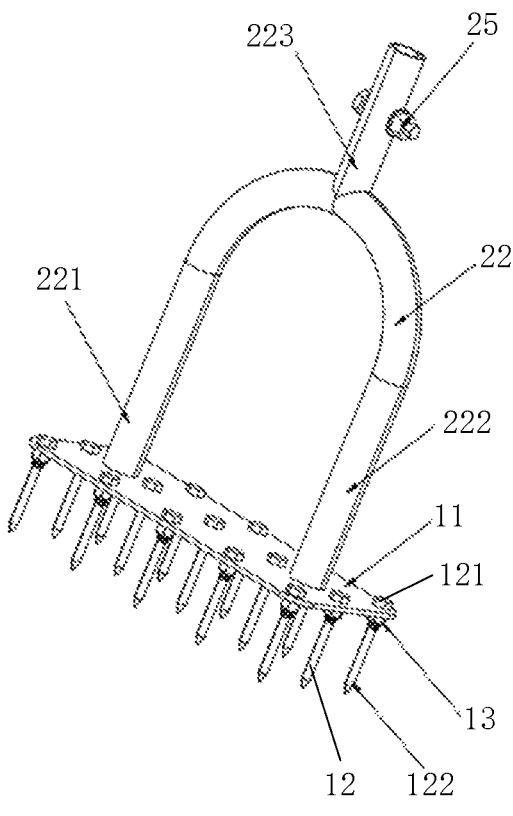
FIG. 2 is a schematic structural view of a punching assembly according to an embodiment of the present disclosure.

The present disclosure provides an aerator for punching holes on a lawn. As shown in FIGS. 1 and 2, the aerator includes a punching assembly 1 and an installation body 2.

The punching assembly 1 includes a fixed plate 11 and multiple rows of punching nails 12 installed on the fixed plate 11 and extending from a bottom surface of the fixed plate 11, with each row including multiple punching nails 12; The punching assembly 1 is installed on the mounting body 2, wherein the installation body 2 is provided with a hand-held part, and the hand-held part is configured for a user to hold while using the aerator to punch holes.

When using the aerator provided by the present disclosure to punch holes, a user can hold the hand-held part (the hand-held part can be arranged at a height position above the fixed plate 11 which is suitable for the height of a person), and punch holes in a manner of pressing the rows of punching nails by stepping on the fixed plate 11, so that the punching efficiency is high, and the aerator is flexible and convenient to use, and the structure of the aerator is simple and the cost is low.

In one embodiment, the punching nail 12 is detachably installed on the fixed plate 11. In this way, when the punching nail 12 is damaged or bent, the punching nail 12 can be replaced without replacing the whole aerator, which is beneficial to saving cost.

Figure 3:
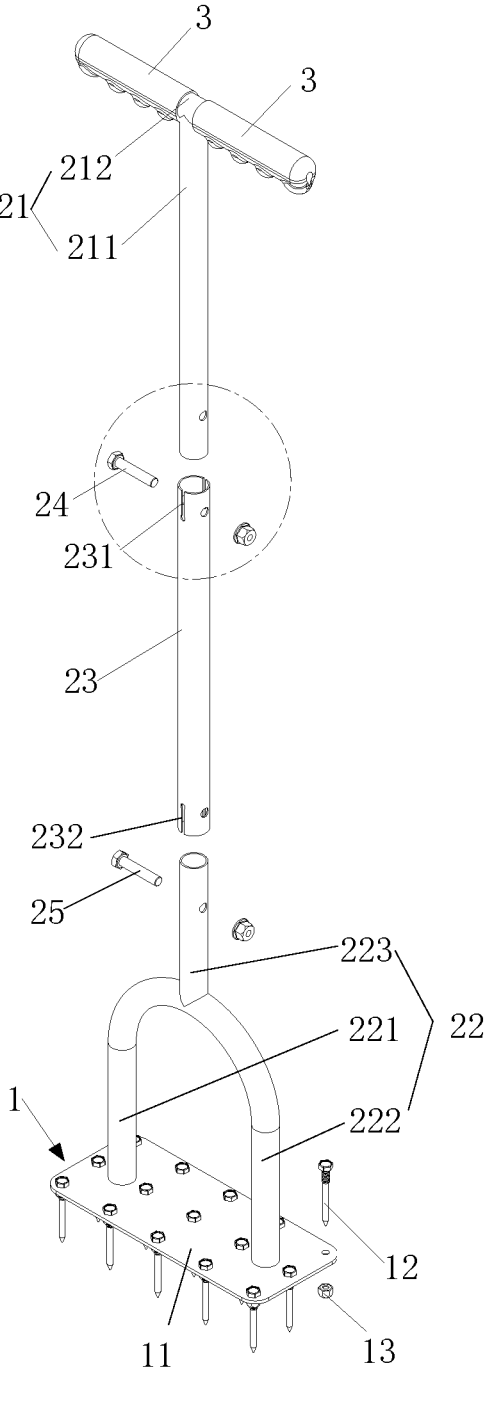
FIG. 3 is a schematic view of an exploded structure of the aerator according to an embodiment of the present disclosure.
Figure 5:
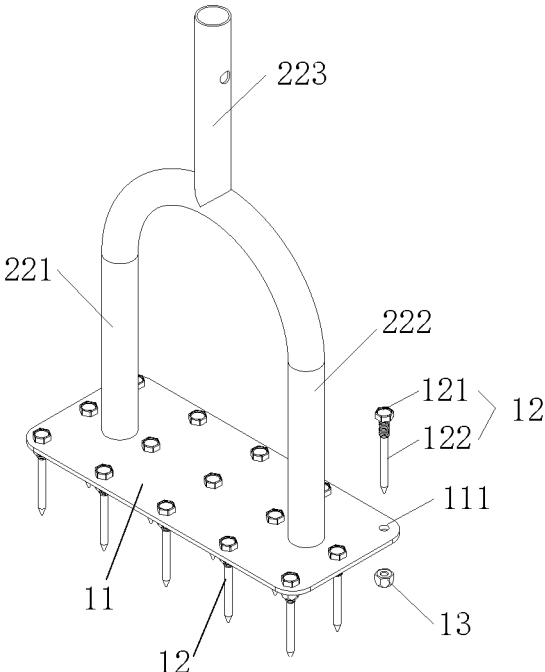
FIG. 5 is a schematic structural view of the punching assembly of the aerator in FIG. 3.

Specifically, as shown in FIGS. 3 and 5, the punching nail 12 includes a nail body 122 and a nail cap 121 provided at one end of the nail body 122.

The fixed plate 11 is provided with installation holes 111 corresponding to punching nail s 12 one by one. The nail body 122 of the punching nail 12 passes downwards through a installation hole 111 from the upper side of the fixed plate 11, and is connected with a nut 13 through thread, so the punching nail 12 is detachably fastened to the fixed plate 11; a cross section of the nail body 122 at a lower end tapers gradually in a direction away from the fixed plate 11, which makes it easier to insert the punching nail 12 into the ground.

Alternatively, a diameter of the nail body 122 of the punching nail 12 is 4-6 mm, the diameter of the nail body 122 refers to the diameter of the cylindrical portion, not the diameter of the end portion with a tapered cross section.

Alternatively, a length of the nail body 122 of the punching nail 12 from the fixed plate 11 to the lower end is 60-70 mm.

Alternatively, the punching nails 12 are arranged in three rows; and/or each row is provided with five punching nails.

Alternatively, a distance between two adjacent rows of punching nails is 35-45 mm, and a distance between two adjacent punching nails in each row is 50-60 mm.

By setting appropriate parameters such as the diameter and length of the punching nails 12 and the number of the punching nails 12, a larger number of punching nails 12 can be easily inserted into the ground of the lawn at the same time, which is beneficial for improving the punching efficiency and solving the time-consuming and labor-consuming problem of inserting a large number of punching nails into the ground simultaneously.

In one embodiment, as shown in FIG. 2, the fixed plate 11 is provided with a foot-pedaling part which can be stepped by a user to exert pressure on the punching nails 12 when punching holes.

Alternatively, installation body 2 includes a first connecting rod 221 and a second connecting rod 222, which are fixed on one side of the fixed plate 11 away from the punching nails 12, the first connecting rod 221 and the second connecting rod 222 may be fixed to the fixed plate 11 by welding or by bolting. The region of the fixed plate between the first connecting rod 221 and the second connecting rod 222 forms the foot-pedaling part for pedaling.

In this embodiment, three rows of punching nails 12 are arranged along the front-back direction of the fixed plate 11, and each row is provided with five punching nails 12. The front-back direction of the fixed plate 11 refers to the front-back direction as a foot steps on the fixed plate 11, a plurality of rows are arranged in the front-back direction of the fixed plate 11, so that a plurality of punching nails in each row are arranged in the width direction of the foot.

It can be understood that the punching nails 12 are not limited to be arranged in three rows, the punching nails 12 can be arranged in other rows, and the diameter and length of the nail body are not limited to the above values, and the quantity, diameter and length of the punching nails 12 can be changed adaptively.

In one embodiment, as shown in FIG. 3, the installation body 2 includes: a first subassembly 21, a second subassembly 22, and a third subassembly 23. The hand-held part is arranged on the first subassembly 21; the second subassembly 22 connects to one side of the fixed plate 11 away from the punching nails 12; the third subassembly 23 is connected between the first subassembly 21 and the second subassembly 22 and detachably connected with the first subassembly 21 and the second subassembly 22 respectively.

By dividing the installation body 2 into a plurality of detachable parts, the aerator can be detached when not in use, which is convenient for storage and carrying, saves storage space, and can be assembled when in use.

Alternatively, the second subassembly 22 includes the first connecting rod 221, the second connecting rod 222 which are installed on the fixed plate, and a third connecting rod 223. The third connecting rod 223 respectively connected to the first connecting rod 221 and the second connecting rod 222. The region of the fixed plate 11 located between the first connecting rod 221 and the second connecting rod 222 forms the foot-pedaling part for stepping on. The third subassembly 23 is configured to be detachably connected with the third connecting rod 223.

Alternatively, the first subassembly 21 includes a horizontal rod 212 and a vertical rod 211 perpendicular to the horizontal rod 212, the horizontal rod 212 extends from both sides of the vertical rod 211 to form two hand-held parts. The third subassembly 23 is detachably connected with the vertical rod 211. The aerator further includes two handle gloves 3, and the two handle gloves 3 are respectively sleeved on the two hand-held parts.

Figure 4:
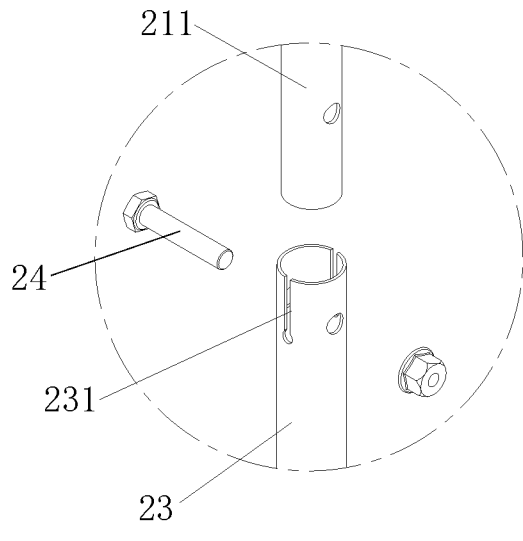
FIG. 4 is a partially enlarged schematic view of the structure shown in FIG. 3.

With specific reference to the embodiment shown in FIGS. 3-5, the installation body 2 includes a first subassembly 21, a second subassembly 22 and a third subassembly 23 which are detachably connected together. The first subassembly 21 includes a horizontal rod 212 and a vertical rod 211 perpendicular to the horizontal rod 212. The parts of the horizontal rod 212 located at both sides of the vertical rod 211 are respectively formed as the hand-held parts, and the two hand-held parts are respectively sleeved with a handle glove 3. The second subassembly 22 includes a first connecting rod 221, a second connecting rod 222 and a third connecting rod 223 respectively connected to the first connecting rod 221 and the second connecting rod 222. The first connecting rod 221 and the second connecting rod 222 are connected to the fixed plate 11, and the space between the first connecting rod 221 and the second connecting rod 222 forms a space for accommodating feet, so that the feet can step on the fixed plate 11 between the first connecting rod 221 and the second connecting rod 222. Wherein the parts of the first connecting rod 221 and the second connecting rod 222 close to the third connecting rod 223 are arc-shaped, so that the first connecting rod 221 and the second connecting rod 222 are connected to form a U-shaped structure.

In one embodiment, in order to facilitate the connection and lose weight, the first subassembly 21, the second subassembly 22 and the third subassembly 23 are respectively made of tube body; One end of the third subassembly 23 is sleeved with the first subassembly 21 and fixed to the first subassembly 21 with a first bolt 24, and the other end is sleeved with the second subassembly 22 and fixed to the second subassembly 22 with a second bolt 25.

In order to make the third subassembly 23 more tightly connected with the first subassembly 21 and the second subassembly 22 respectively. Alternatively, among two tube parts, that are mutually sleeved, of the third subassembly 23 and the first subassembly 21, the tube part arranged outside is provided with a first open notch 231 extending to an end, the first open notch 231 is configured that the tube part arranged outside is able to be constricted through the first open notch 231 to press against the tube part arranged inside when the first bolt 24 is used to connect.

Alternatively, among two tube parts, that are mutually sleeved, of the third subassembly 23 and the second subassembly 22, the tube part arranged outside is provided with a second open notch 232 extending to an end, the second open notch 232 is configured that the tube part arranged outside is able to be constricted through the second open notch 232 to press against the tube part arranged inside when the second bolt 25 is used to connect.

Specifically, as shown in FIG. 3, the third subassembly 23 is a linear tube, one end of which is sleeved outside the vertical tube 211 of the first subassembly 21, and the other end of which is sleeved outside the third connecting rod 223 of the second subassembly 22. At both ends of the third subassembly 23, a first open notch 231 and a second open notch 232 are respectively provided. The first open notch 231 and the second open notch 232 can be provided with two respectively, which can be arranged symmetrically along the circumferential direction of the tube. and of course, a plurality of first open notches 231 and the second open notches 232 can also be provided along the circumferential direction. The first open notch 231 and the second open notch 232 extend to the very end of their respective end. In this way, when one end of the third subassembly 23 is sleeved outside the vertical tube 211, the end of the third subassembly 23 can be constricted and pressed against the vertical tube 211 under the fastening action of the first bolt 24, so that the two parts are firmly connected. Similarly, the other end of the third subassembly 23 can be constricted and pressed against the third connecting rod 223 under the fastening action of the second bolt 25.

It can be understood by those skilled in the art that the structure of the installation body 2 can be various and is not limited to the above-mentioned structural form.

The above is only the preferred embodiment of this disclosure, and it is not used to limit this disclosure. Any modification and equivalent substitution made within the spirit and principle of this disclosure should be included in the protection scope of this disclosure.

What is claimed is:

1. An aerator, comprising,
a punching assembly, comprising a fixed plate and multiple rows of punching nails installed on the fixed plate and extending from a bottom surface of the fixed plate, each row comprising multiple punching nails; and
an installation body, the punching assembly being installed on the installation body, wherein the installation body is provided with a hand-held part, and the hand-held part is configured for a user to hold while using the aerator to punch holes, each punching nail is detachably installed on the fixed plate, and comprises a nail body and a nail cap provided on one end of the nail body; the fixed plate is provided with installation holes corresponding to the punching nails one by one, the nail body passes downwards through an installation hole from the upper side of the fixed plate, and is connected with a nut through a thread, so that the punching nail is detachably fastened to the fixed plate; the cross section of the nail body at a lower end tapers gradually in a direction away from the fixed plate.

2. The aerator according to claim 1, wherein a diameter of the nail body of each punching nail is 4-6 mm.

3. The aerator according to claim 1, wherein a length of the nail body of each punching nail from the fixed plate to a lower end is 60-70 mm.

4. The aerator according to claim 1, wherein a distance between two adjacent rows of punching nails is 35-45 mm, and a distance between two adjacent punching nails in each row is 50-60 mm.

5. The aerator according to claim 1, wherein the punching nails are arranged in three rows.

6. The aerator according to claim 1, wherein each row is provided with five punching nails.

7. The aerator according to claim 1, wherein the fixed plate is provided with a foot-pedaling part which is configured to be stepped by a user to apply pressure on the punching nails when punching holes.

8. The aerator according to claim 7, wherein the installation body comprises a first connecting rod and a second connecting rod fixed on one side of the fixed plate away from the punching nails, and a region of the fixed plate between the first connecting rod and the second connecting rod forms the foot-pedaling part.

9. The aerator according to claim 1, wherein the installation body comprises:
a first subassembly, on which the hand-held part is arranged;
a second subassembly, connected to one side of the fixed plate away from the punching nails; and a third subassembly, connected between the first subassembly and the second subassembly and detachably connected with the first subassembly and the second subassembly respectively.

10. The aerator according to claim 9, wherein the second subassembly comprises a first connecting rod, a second connecting rod which are installed on the fixed plate, and a third connecting rod respectively connected to the first connecting rod and the second connecting rod, the third subassembly is configured to be detachably connected with the third connecting rod;
a region of the fixed plate located between the first connecting rod and the second connecting rod forms the foot-pedaling part.

11. The aerator according to claim 9, wherein the first subassembly comprises a horizontal rod and a vertical rod perpendicular to the horizontal rod, the horizontal rod extends from both sides of the vertical rod to form two hand-held parts, the third subassembly is detachably connected with the vertical rod;
the aerator further comprises two handle gloves, and the two handle gloves are respectively sleeved on the two hand-held parts.

12. The aerator according to claim 9, wherein the first subassembly, the second subassembly and the third subassembly are respectively made of a tube body;
one end of the third subassembly is sleeved with the first subassembly and fixed to the first subassembly with a first bolt, and the other end is sleeved with the second subassembly and fixed to the second subassembly with a second bolt.

13. The aerator according to claim 12, wherein, among two tube parts, that are mutually sleeved, of the third subassembly and the first subassembly, the tube part arranged outside is provided with a first open notch extending to an end, and the first open notch is configured that the tube part arranged outside is able to be constricted through the first open notch to press against the tube part arranged inside when a bolt is used to connect.

14. The aerator according to claim 12, wherein, among two tube parts, that are mutually sleeved, of the third subassembly and the second subassembly, the tube part arranged outside is provided with a second open notch extending to an end, and the second open notch is configured that the tube part arranged outside is able to be constricted through the second open notch to press against the tube part arranged inside when a bolt is used to connect.

* * * * *